(12) United States Patent
Shimoguchi

(10) Patent No.: US 7,589,915 B2
(45) Date of Patent: Sep. 15, 2009

(54) OPTICAL ELEMENT, OPTICAL MODULE HOLDER INCLUDING OPTICAL ELEMENT, OPTICAL MODULE, AND OPTICAL CONNECTOR

(75) Inventor: Tomohiro Shimoguchi, Kawaguchi (JP)

(73) Assignee: Enplas Corporation, Saitama (JP)

( * ) Notice: Subject to any disclaimer, the term of this patent is extended or adjusted under 35 U.S.C. 154(b) by 93 days.

(21) Appl. No.: 11/999,755

(22) Filed: Dec. 7, 2007

(65) Prior Publication Data

US 2008/0138091 A1    Jun. 12, 2008

(30) Foreign Application Priority Data

Dec. 8, 2006   (JP)  ............... 2006-331896

(51) Int. Cl.
  *G02B 3/08*   (2006.01)
  *G02B 6/36*   (2006.01)
  *G02B 6/00*   (2006.01)

(52) U.S. Cl. .................... 359/737; 385/93; 385/140

(58) Field of Classification Search ............... 359/718, 359/720, 737, 742; 385/88, 92, 93, 140; 398/139
See application file for complete search history.

(56) References Cited

U.S. PATENT DOCUMENTS

| 7,056,037 | B2* | 6/2006 | Ozeki et al. | ............... 385/92 |
| 7,121,738 | B2* | 10/2006 | Baur | ............... 385/88 |
| 7,347,629 | B2* | 3/2008 | Shibayama et al. | ............... 385/88 |
| 2006/0118704 | A1* | 6/2006 | Shimoguchi | ............... 250/216 |
| 2008/0088929 | A1* | 4/2008 | Morioka et al. | ............... 359/566 |
| 2008/0142815 | A1* | 6/2008 | Morioka | ............... 257/81 |
| 2009/0016676 | A1* | 1/2009 | Morioka | ............... 385/27 |

FOREIGN PATENT DOCUMENTS

| JP | 11-119063 | 4/1999 |
| JP | 11-142696 | 5/1999 |

* cited by examiner

*Primary Examiner*—David N Spector
(74) *Attorney, Agent, or Firm*—William L. Androlia; H. Henry Koda

(57) ABSTRACT

It is to provide an optical element, an optical module holder including the optical element, an optical module, and an optical connector that can attenuate with high accuracy an amount of light coupled between an optical transmission line and a photonic element using light refraction, thereby realizing appropriate optical communication while reducing manufacturing costs.

A light attenuating refractive surface 7 is formed on an optical surface 4 disposed on an optical path between an optical transmission line 2 and a photonic element 3 in a main body of the optical element. The light attenuating refractive surface 7 attenuates the amount of light coupled between the optical transmission line 2 and the photonic element 3 by refracting and deflecting incident light.

9 Claims, 10 Drawing Sheets

OPTICAL ELEMENT, OPTICAL MODULE HOLDER INCLUDING OPTICAL ELEMENT, OPTICAL MODULE, AND OPTICAL CONNECTOR

BACKGROUND OF THE INVENTION

1. Field of the Invention

The present invention relates to an optical element, an optical module holder including the optical element, an optical module, and an optical connector. In particular, the present invention relates to an optical element, an optical module holder including the optical element, an optical module, and an optical connector that are suitable for attenuating an amount of light coupled between an optical transmission line and a photonic element.

2. Description of the Related Art

Conventionally, a following technology is used to perform optical communication using optical fiber. In the technology, the optical fiber and a photoelectric conversion element (such as a semiconductor laser) are each attached to an optical element including an optical surface (such as a lens surface). The optical fiber and the photoelectric conversion element are optically coupled using transmission and refraction of light by the optical surface of the optical element.

In an optical communication using optical fiber such as this, the amount of light coupled between the optical fiber and the photoelectric conversion element, via the optical element, is required to be attenuated for reasons related to communication standards, security, and the like. To meet such a requirement, the optical element conventionally includes a light-absorptive material, a light-absorptive film, a diffraction grating, and the like.

Technologies disclosed in Patent Literature 1 and Patent Literature 2, for example, are known as conventional technologies related to an optical element including a function for attenuating an amount of light, such as that above.

In other words, in Patent Literature 1, a following semiconductor laser module is disclosed. In the semiconductor laser module, a concentric diffraction ring structure is formed on a lens surface of a plastic condenser lens. As a result, the semiconductor laser module can limit an output value of diffracted light.

In Patent Literature 2, an optical module including a light attenuating section is disclosed. The light attenuating section is formed by metal or a dielectric material being laminated onto a flat, glass substrate and the like by deposition or sputtering.

[Patent Literature 1] Japanese Patent Laid-open Publication No. Heisei 11-142696

[Patent Literature 2] Japanese Patent Laid-open Publication No. Heisei 11-119063

However, the conventional technologies disclosed in Patent Literature 1 and Patent Literature 2 have problems related to optical characteristics or manufacturing, such as those described below.

As the material used to form the condenser lens, Patent Literature 1 discloses the use of a plastic material to which a light-absorptive material has been added. However, when the light-absorptive material is added to the plastic material in this way, the amount of light absorbed (in other words, the amount of light attenuated) changes because of variations in the concentration of the added light-absorptive material. This causes instability in the light emitted from the optical element. Moreover, the amount of light-absorptive material to be included is required to be changed based on the transmittance of the plastic material. As a result, cost may increase.

The optical module described in Patent Literature 2 requires sputtering or deposition of the metal or lamination of the dielectric material. As a result, the manufacturing process may become complicated and cost may increase.

Moreover, in Patent Literature 2, the light attenuating section and the condenser lens are formed separately. The manufacturing process during assembly may become complicated and the cost may increase because of the increase in the number of components, thereby interfering with the desired optical characteristics being achieved.

SUMMARY OF THE INVENTION

The present invention has been achieved in light of the above-described problems. An object of the invention is to provide an optical element, an optical module holder including the optical element, an optical module, and an optical connector that can attenuate with high accuracy an amount of light coupled between an optical transmission line and a photonic element using light refraction, thereby realizing appropriate optical communication while reducing manufacturing costs.

In order to achieve the aforementioned object, an optical element according to a first aspect of the present invention is an optical element that, when disposed on an optical path between an optical transmission line and a photonic element that either emits or receives light or both emits and receives light, attenuates an amount of light coupled between the optical transmission line and the photonic element. In the optical element, a light attenuating refractive surface is formed on an optical surface disposed on the optical path between the optical transmission line and the photonic element in a main body of the optical element. The light attenuating refractive surface attenuates the amount of light coupled between the optical transmission line and the photonic element by refracting and deflecting incident light.

In the first aspect of the invention, the amount of light coupled between the optical transmission line and the photonic element can be attenuated using light refraction by the light attenuating refractive surface. As a result, manufacturing cost of the optical element can be reduced and appropriate optical communication can be realized.

An optical element according to a second aspect is the optical element according to the first aspect, wherein, the light attenuating refractive surface is formed at an angle to an optical axis of the optical surface.

In the second aspect of the invention, the light attenuating refractive surface can be formed into a shape having an angle preferable for light refraction. As a result, cost can be further reduced and a more appropriate optical communication can be realized.

An optical element according to a third aspect is the optical element according to the first aspect, wherein the light attenuating refractive surface is formed in a groove section caving inwards from the optical surface. The light attenuating refractive surface is circular, ring-shaped, or rectangular when viewed from an optical axis direction.

In the third aspect of the invention, the light attenuating refractive surface is formed in the groove section that caves inwards from the optical surface. Therefore, compared to when the light attenuating refractive surface is formed such as to project from the optical surface, light used for optical communication can be more appropriately incident onto the optical surface. As a result, a more appropriate optical communication can be realized. An amount of material used to form the optical element can be reduced, thereby further reducing cost.

An optical element according to a fourth aspect is the optical element according to the third aspect, wherein the groove section has a wedge-shaped cross-section in the optical axis direction.

In the fourth aspect of the invention, the light attenuating refractive surface can be easily formed and formed into an inclined plane preferable for light refraction. As a result, cost can be further reduced and a more appropriate optical communication can be realized.

An optical element according to a fifth aspect is the optical element according to the first aspect, wherein the optical surface has a function for coupling light between the optical transmission line and the photonic element.

In the fifth aspect of the invention, light incident onto the optical surface can be effectively used for optical communication.

An optical element according to a sixth aspect is the optical element according to the first aspect, wherein the optical surface and the light attenuating refractive surface are integrally formed using a resin material.

In the sixth aspect of the invention, the optical surface and the light attenuating refractive surface can be integrally formed using inexpensive resin material. As a result, manufacturing costs can be further reduced. Furthermore, manufacturing procedures can be reduced and mass-productivity can be enhanced.

An optical module holder according to a seventh aspect comprises an optical element according to any one of claims 1 to 6, an optical transmission line attaching section for attaching an end face of an optical transmission line, and a photonic element attaching section for attaching a photonic element that either emits or receives light or both emits and receives light. The optical element, the optical transmission line attaching section, and the photonic element attaching section are integrally formed using a resin material.

In the seventh aspect of the invention, the amount of light coupled between the optical transmission line and the photonic element can be attenuated using light refraction by the light attenuating refractive surface. In addition, the optical element, the optical transmission line attaching section, and the photonic element attaching section can be integrally formed using resin material. As a result, manufacturing cost of the optical module holder can be reduced and appropriate optical communication can be realized.

An optical module according to an eighth aspect comprises an optical module holder according to claim 7 and a photonic element that either emits or receives light or both emits and receives light.

In the eighth aspect of the invention, the amount of light coupled between the optical transmission line and the photonic element can be attenuated using light refraction by the light attenuating refractive surface. In addition, the optical module holder can be integrally formed using resin material. As a result, manufacturing cost of the optical module can be reduced and appropriate optical communication can be realized.

An optical connector according to a ninth aspect comprises an optical module according to claim 8 and a housing that houses the optical module.

In the ninth aspect of the invention, manufacturing cost of the optical connector can be reduced and appropriate optical communication can be realized.

[Effect of the Invention]

In the invention, an amount of light coupled between an optical transmission line and a photonic element can be attenuated with high accuracy using light refraction. As a result, appropriate optical communication can be realized while reducing manufacturing costs.

DETAILED DESCRIPTION OF THE PREFERRED EMBODIMENT

First Embodiment

A first embodiment of the present invention will be described with reference to FIG. 1 to FIG. 4

Figure 1:
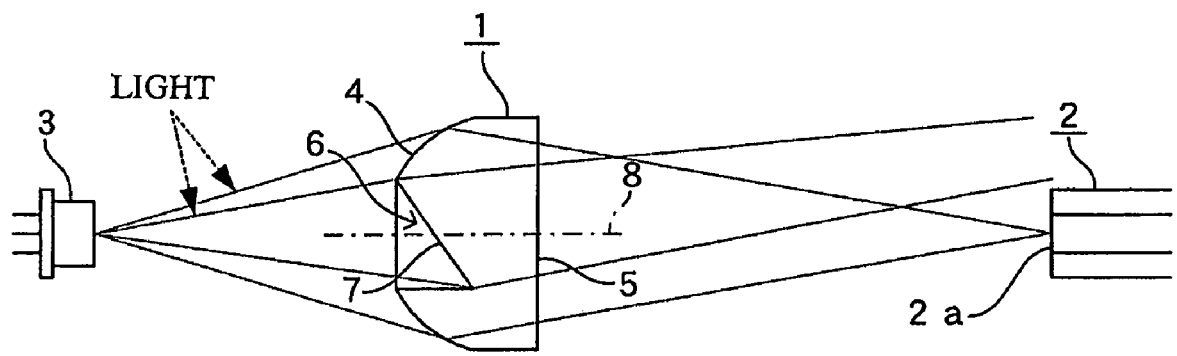
FIG. 1 is a schematic diagram of an optical element according to a first embodiment of the present invention.

As shown in FIG. 1, an optical element 1 according to the embodiment is disposed on an optical path connecting an optical fiber 2 and a semiconductor laser 3. The optical fiber 2 serves as an optical transmission line. The semiconductor laser 3 serves as a photoelectric conversion element (photonic element). The optical element 1 is used in optical communication by the optical element 1 coupling a portion of light emitted from the semiconductor laser 3 with an end face of the optical fiber 2.

More specifically, an optical surface of the optical element 1 on the semiconductor laser 3 side is formed into a lens surface 4. The lens surface 4 is convex on the semiconductor laser 3 side. An optical surface on the optical fiber 2 side is formed into a flat surface 5.

A groove section 6 having a wedge-shaped (namely, a saw tooth-shaped) cross-section in an optical axis 8 direction is formed in the center of the lens surface 4. The groove section 6 is formed such as to cave inward from the lens surface 4.

Figure 2:
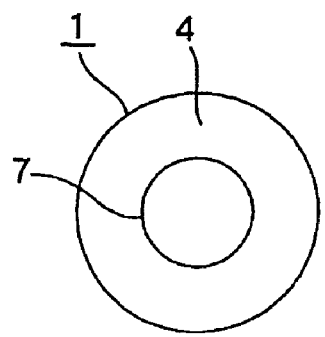
FIG. 2 is a diagram of the optical element shown in FIG. 1, viewed from an optical axis direction.

A light attenuating refractive surface 7 is formed in the groove section 6. The light attenuating refractive surface 7 is formed as an inclined plane having an incline of a constant angle to the optical axis 8. As shown in FIG. 2, the light attenuating refractive surface 7 is formed such as to be circular when viewed from the optical axis 8 direction.

The lens surface 4 transmits light emitted from the semiconductor laser 3 and incident onto the lens surface 4 by refracting the light towards the optical fiber 2 side. As a result, the light incident onto the lens surface 4 can be concentrated onto an end face 2a of the optical fiber 2 after being emitted from the flat surface 5 and coupled with the end face 2a.

At the same time, the light attenuating refractive surface 7 transmits light emitted from the semiconductor laser 3 and incident onto the light attenuating refractive surface 7 by refracting the light towards a direction out of alignment with the optical fiber 2. As a result, the light incident onto the light attenuating refractive surface does not couple with the end face 2a of the optical fiber 2 after being emitted from the flat surface 5.

Therefore, according to the embodiment, the amount of light coupled between the semiconductor laser 3 and the optical fiber 2, or in other words, the amount of light coupled with the end face 2a of the optical fiber 2 after the light is emitted from the semiconductor laser 3 can be attenuated with high accuracy using light refraction by the simply-structured light attenuating refractive surface 7.

As a result, the optical element 1 can be manufactured at a low cost. The optical communication can be appropriately performed as well.

Furthermore, the optical element 1 according to the embodiment is preferably formed by injection-molding using a light-transmitting resin material, such as polyetherimide (PEI), polycarbonate (PC), and polymethylmethacrylate (PMMA). As a result, the optical element 1 can be manufactured at a low cost.

Figure 3:
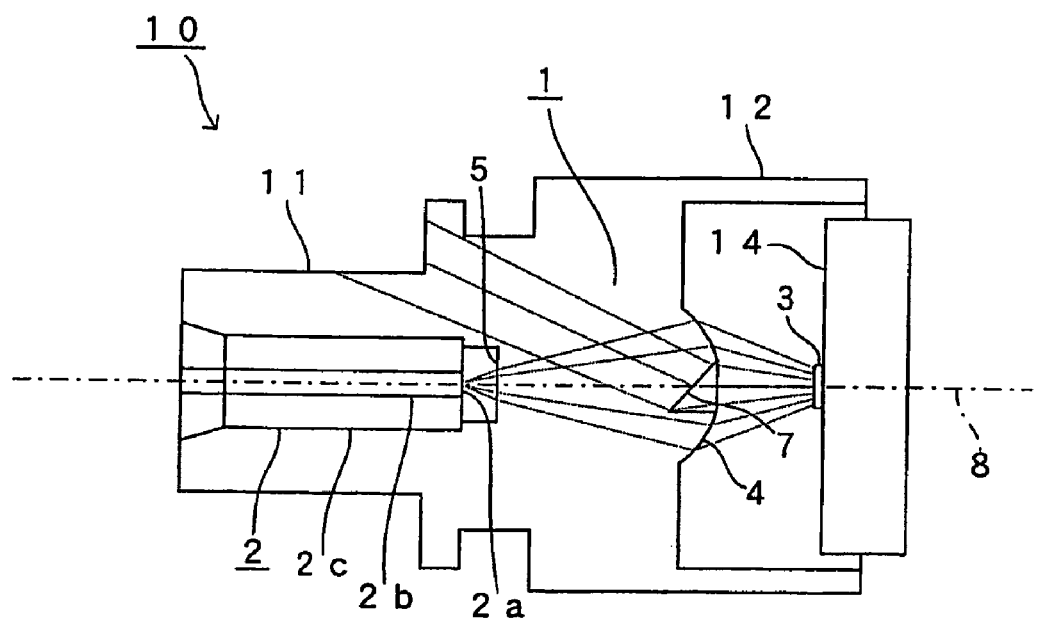
FIG. 3 is a schematic diagram of an optical module holder and an optical module according to the first embodiment of the invention.
Figure 4:
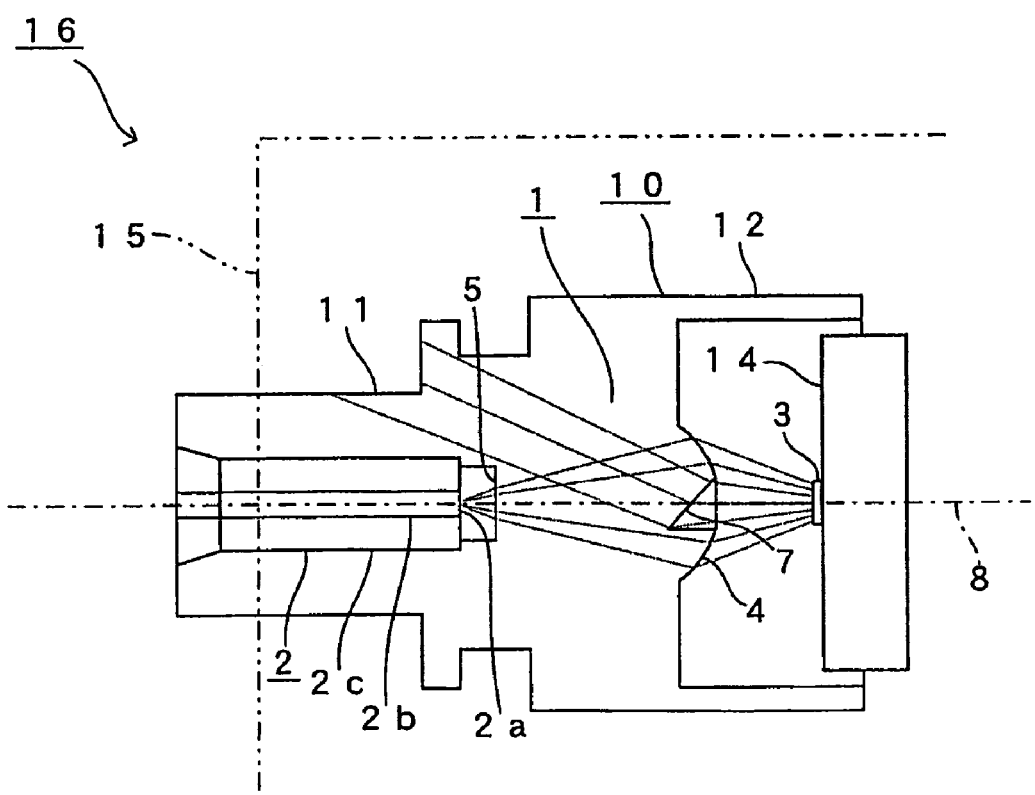
FIG. 4 is a schematic diagram of an optical connect or according to the first embodiment of the invention.

In an optical element 1 such as this, as shown in FIG. 3, a cylindrical optical fiber attaching section 11 is disposed on the flat surface 5 side of the optical element. A cylindrical photoelectric conversion element attaching section 12 is disposed on the lens surface 4 side of the optical element 1. As a result, an optical module holder 10 is formed.

The optical fiber attaching section 11 serves as an optical transmission line attaching section. The photoelectric conversion element attaching section 12 serves as the photonic element attaching section.

As shown in FIG. 3, the optical fiber 2, in addition to a ferrule 2c that holds a fiber core 2b, is attached within the optical fiber attaching section 11 such as to be held to the inner circumferential surface of the optical fiber attaching section 11 from the outer side. The semiconductor laser 3 is attached to the photoelectric conversion element attaching section 12 such as to be, for example, mounted onto a substrate 14 of the semiconductor. A light-receiving photoelectric conversion element (such as a photodetector) can also be mounted onto the substrate 14 to support bidirectional communication.

When an optical module holder 10 such as this is integrally formed by injection-molding using resin material, cost can be reduced and manufacturing efficiency can be enhanced.

Furthermore, an optical connector 16 is formed as a result of the optical module holder 10 being housed within a housing 15, as shown in FIG. 14.

Second Embodiment

Next, the present invention according to a second embodiment will be described with reference to FIG. 5 and FIG. 6.

Figure 5:
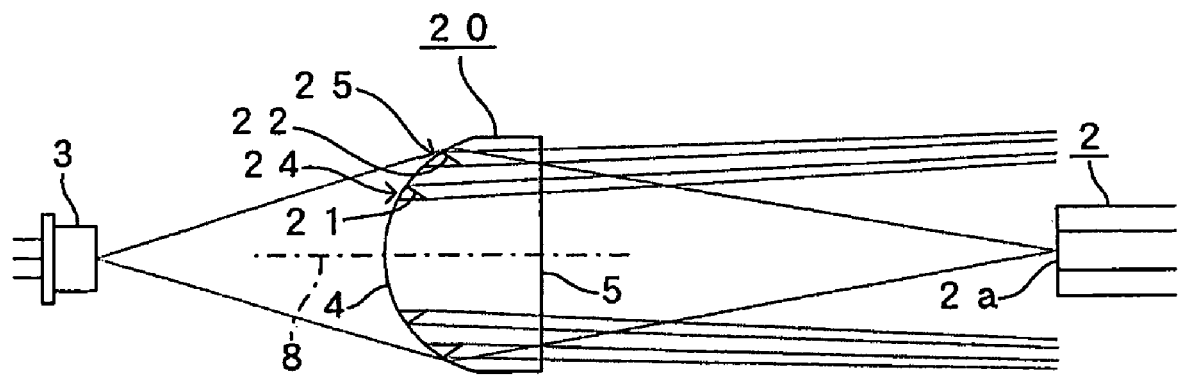
FIG. 5 is a schematic diagram of an optical element according to a second embodiment of the invention.

As shown in FIG. 5, an optical element 20 according to the embodiment is used in optical communication by the optical element 20 coupling a portion of light emitted from the semiconductor laser 3 with the end face of the optical fiber 2, as according to the first embodiment. The optical surface on the semiconductor laser 3 side is formed into the lens surface 4 that is convex on the semiconductor laser 3 side. The optical surface on the optical fiber 2 side is formed into the flat surface 5.

A light attenuating refractive surface 21 and a light attenuating refractive surface 22 are formed on the lens surface 4. The light attenuating refractive surface 21 and the light attenuating refractive surface 22 are used to attenuate the amount of light coupled with the end face 2a of the optical fiber 2 after the light is emitted from the semiconductor laser 3.

However, according to the embodiment, a specific structure of the light attenuating refractive surface differs from that according to the first embodiment.

In other words, as shown in FIG. 5, a ring-shaped first groove section 24 is formed on the lens surface 4, such as to cave inward from the lens surface 4. The cross-section of the first groove section 24 in the optical axis 8 direction is formed into a wedge-shape. The optical axis 8 is positioned at the center of the first groove section 24.

A tapered first light attenuating refractive surface 21 is formed in the first groove section 24. The first light attenuating refractive surface 21 is formed such that the distance from the optical axis 8 decreases from the lens surface 4 side towards the flat surface 5.

Figure 6:
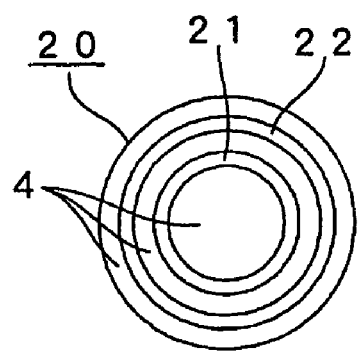
FIG. 6 is a diagram of the optical element shown in FIG. 5, viewed from an optical axis direction.

The first light attenuating refractive surface 21 is ring-shaped when viewed from the optical axis 8 direction, as shown in FIG. 6.

As shown in FIG. 5, a ring-shaped second groove section 25 that is concentric with the first groove 24 is formed on the lens surface 4, in an outer position in the radial direction to the first groove section 24. The second groove section 25 has a wedge-shaped cross-section in the optical axis 8 direction and is formed such as to cave inwards from the lens surface 4. The second groove section 25 surrounds the first groove section 24.

A tapered second light attenuating refractive surface 22 is formed in the second groove section 25. The second light attenuating refractive surface 22 is formed such that the distance from the optical axis 8 decreases from the lens surface side towards the flat surface 5.

The angles of tapering of the first light attenuating refractive surface 21 and the second light attenuating refractive surface 22 can be the same. Alternatively, the angles can differ.

As according to the first embodiment, the optical element 20 according to the embodiment, formed as described above, can refract the light emitted from the semiconductor laser 3 and incident onto the lens surface 4 towards the optical fiber 2 side. As a result, the optical element 20 can couple the light incident onto the lens surface 4 with the end face 2a of the optical fiber 2.

The optical element 20 according to the embodiment can refract the light emitted from the semiconductor laser 3 and incident on each of the first light attenuating refractive surface 21 and the second light attenuating refractive surface 22 towards a direction out of alignment with the optical fiber 2, using the first light attenuating refractive surface 21 and the second light attenuating refractive surface 22. As a result, the optical element 20 does not couple the light incident onto the first light attenuating refractive surface 21 and the second light attenuating refractive surface 22 with the end face 2a of the optical fiber 2.

Therefore, as according to the first embodiment, the amount of light coupled with the end face 2a of the optical fiber 2 can be attenuated using light refraction by the first light attenuating refractive surface 21 and the second light attenuating refractive surface 22 according to the second embodiment, as well.

The optical element 20 according to the embodiment can also be manufactured more efficiently at a lower cost by being integrally formed through injection-molding using resin material. The resin material is made from light-transmitting plastic, such as PEI, PC, and PMMA.

As according to the first embodiment, the optical element 20 according to the embodiment can also include the optical fiber attaching section 11 and the photoelectric conversion element attaching section 12, thereby forming an optical module holder (not shown). Furthermore, an optical module is formed by a photoelectric conversion element, such as the semiconductor laser 3, being attached to the photoelectric conversion element attaching section 12.

EXAMPLES

Next, examples of the present invention will be described, in addition to a comparative example.

Comparative Example

Figure 7:
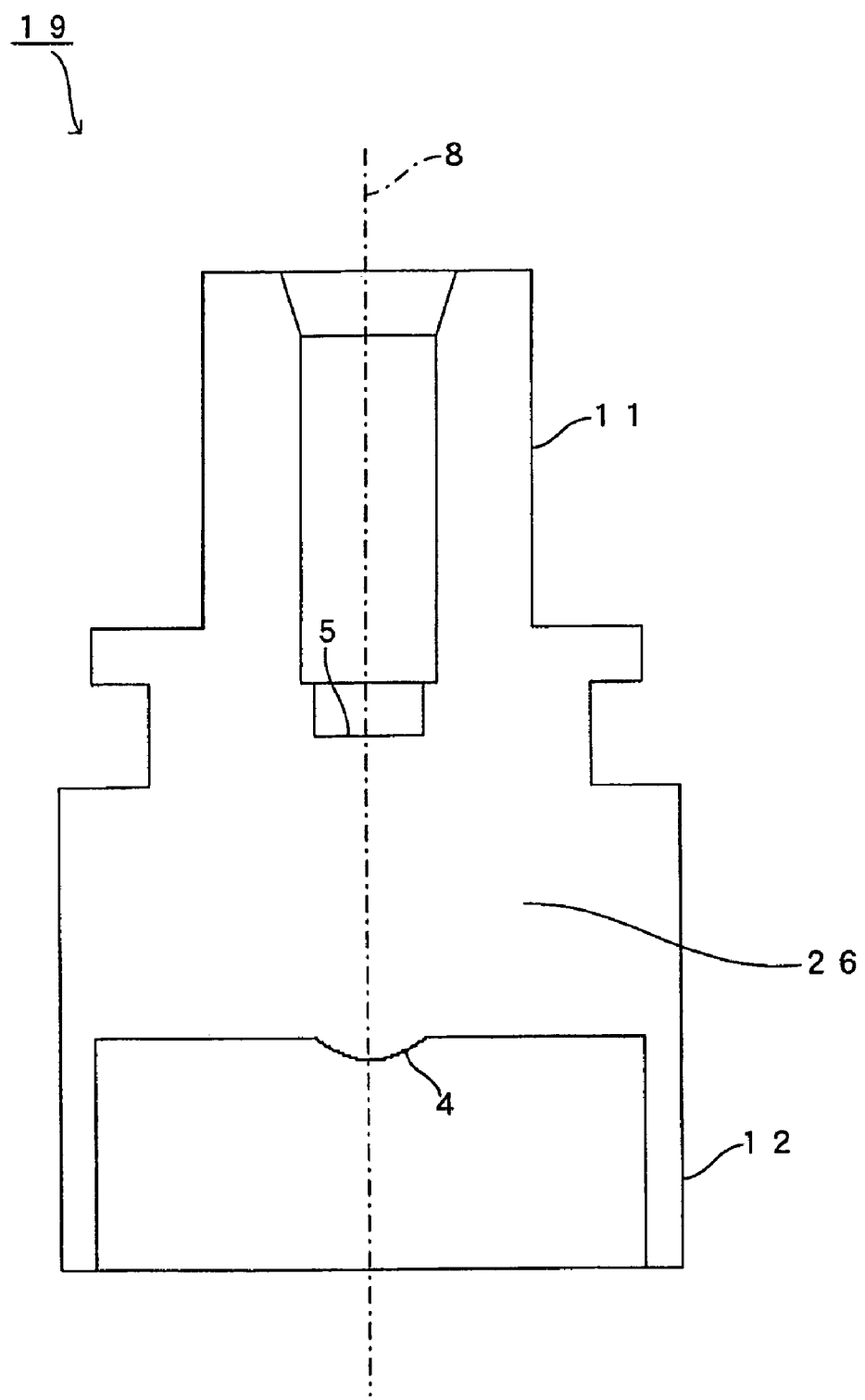
FIG. 7 is a schematic diagram of an optical module holder in a comparative example.

FIG. 7 shows an optical module holder 19 in the comparative example. As shown in FIG. 7, the optical module holder 19 in the comparative example includes an optical element 26. The optical element 26 includes an aspherical (convex-shaped) lens surface 4 and a flat surface 5 facing the lens surface 4 in the optical axis 8 direction. However, a light attenuating refractive surface, such as those according to the above-described embodiments, is not formed on the lens surface 4.

In the optical module holder 19, the optical element 26, the optical fiber attaching section 11, and the photoelectric conversion element attaching section 12 are integrally formed using a resin material having a refractive index of 1.64.

In the optical module holder 19, the diameter of the lens surface 4 (length in a radial direction perpendicular to the optical axis 8) is 1.0 millimeter. The diameter of the flat surface 5 is 1.0 millimeter. The thickness of the optical element 26 (distance from the lens surface 4 to the flat surface 5) is 2.95 millimeters.

Generally, the aspherical shape of the lens surface is expressed by a following aspherical surface expression provided that the direction of the optical axis is taken as a Z axis, the direction orthogonal to the optical axis (height direction) as an h axis, the traveling direction of light is positive, k is a conic constant, C is a curvature, and A is a quartic aspheric coefficient.

$$Z(h)=C \cdot h^2/[1+\{1-(1+k) \cdot C^2 \cdot h^2\}^{1/2}]+Ah^4$$

In the lens surface 4 of the example, C=1.64, K=−1.5, and A=0.11.

When a coupling efficiency of the semiconductor laser 3 and the optical fiber 2 is calculated in a following state, the obtained result is 48%. The coupling efficiency is calculated when the optical fiber 2 of which the fiber core diameter=0.06 millimeters and NA=0.28 is attached to the optical fiber attaching section 11 at a position 0.3 millimeters from the flat surface 5. The semiconductor laser 3 is attached to the photoelectric conversion element attaching section 12 at a position 1.75 millimeters from the lens surface 4. The wavelength used by the semiconductor laser 3 is 850 nanometers. The full width half maximum (FWHM) is an angle (included angle) at which the laser intensity is half of the maximum intensity. The angle is 30°.

First Example

Figure 8:
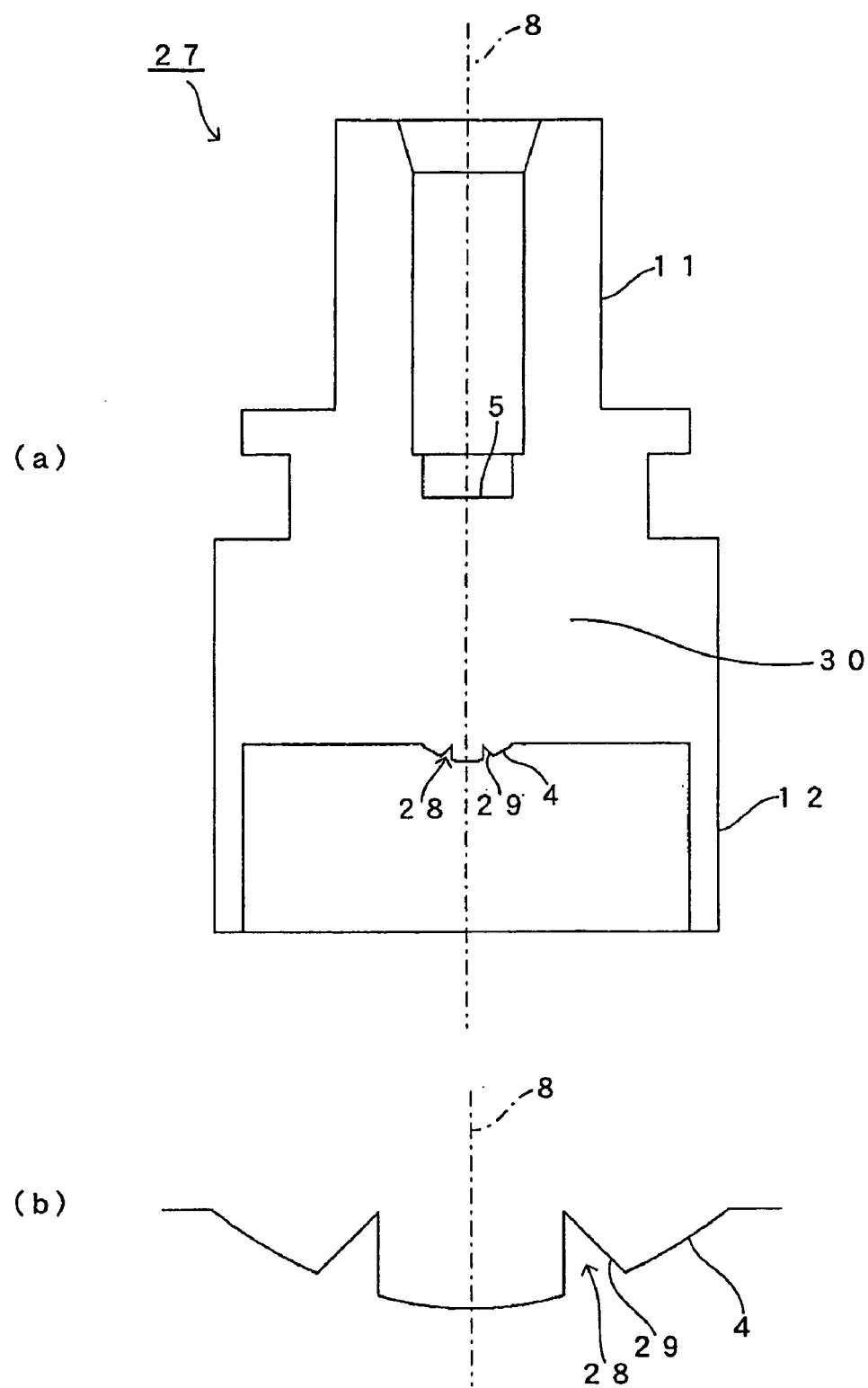
FIG. 8 is a schematic diagram of an optical module holder in a first example of the invention.

Next, FIG. 8(a) shows an optical module holder 27 in a first example. FIG. 8(b) is an enlarged view of the lens surface 4 in FIG. 8(a).

As shown in FIG. 8(a) and FIG. 8(b), the optical module holder 27 of the example includes an optical element 30. In the optical element 30, a single ring-shaped groove section 28 is formed on the aspherical (convex-shaped) lens surface 4. A tapered light attenuating refractive surface 29 is formed in the groove section 28. The groove section 28 has a wedge-shaped cross-section in the optical axis 8 direction. The light attenuating refractive surface 29 is ring-shaped when viewed from the optical axis 8 direction.

In the optical module holder 27, the optical element 30, the optical fiber attaching section 11, and the photoelectric conversion element attaching section 12 are integrally formed using a resin material having a refractive index of 1.64.

In the optical module holder 27, the diameter of the lens surface 4 is 1.0 millimeter. The diameter of the flat surface 5 is 1.0 millimeter. The thickness of the optical element 30 is 2.95 millimeters.

Each coefficient in the aspherical surface expression of the lens surface 4 is C=1.64, K=−1.5, and A=0.11.

A range of occupation of the lens surface 4 in the height h direction is 0 (mm)≦h<0.18 (mm) and 0.3 (mm)≦h<0.5 (mm). At the same time, the range of occupation of the light attenuating refractive surface 29 is 0.18 (mm)≦h<0.3 (mm).

In addition, the light attenuating refractive surface 29 satisfies the following expression:

$$Z(h)=-h+0.37 \text{ (mm)}$$

When the coupling efficiency is calculated in a following state, the obtained result is 34%. The coupling efficiency is calculated when the optical fiber 2 of which the fiber core 2b diameter=0.06 millimeters and NA=0.28 is attached to the optical fiber attaching section 11 of the optical module holder 27 such as that described above at a position 0.3 millimeters from the flat surface 5. The semiconductor laser 3 that is mounted onto the substrate 14 is attached to the photoelectric conversion element attaching section 12 at a position 1.75 millimeters from the lens surface 4. The wavelength used by the semiconductor laser 3 is 850 nanometers. The FWHM is 30°.

The result is 71% of the coupling efficiency in the comparative example. The result indicates that the optical module holder 27 of the first example is more advantageous for attenuating the amount of light coupled with the optical fiber 2, compared to that of the comparative example.

Second Example

Figure 9:
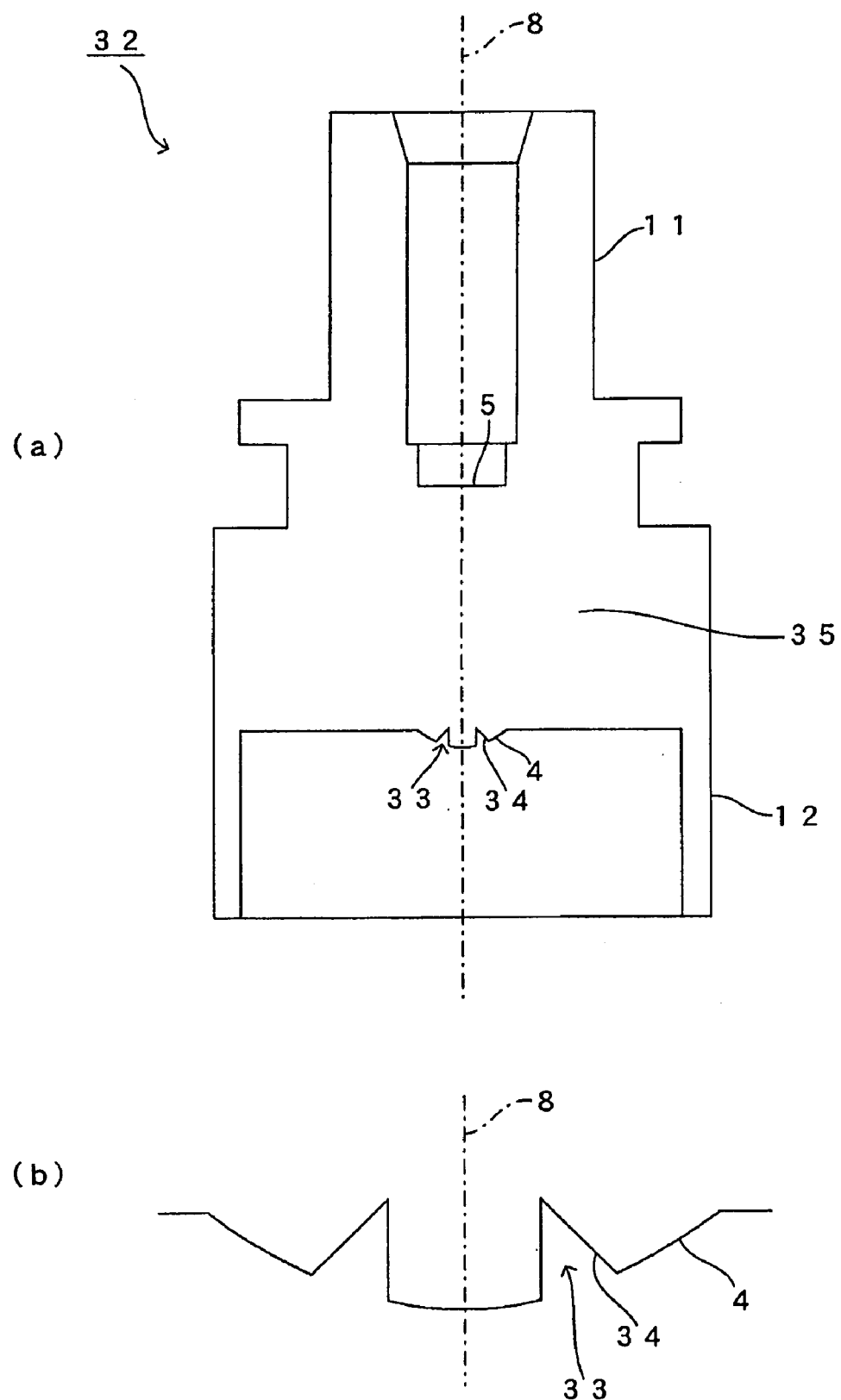
FIG. 9 is a schematic diagram of an optical module holder in a second example of the invention.

Next, FIG. 9(a) shows an optical module holder 32 in a second example. FIG. 9(b) is an enlarged view of the lens surface 4 in FIG. 9(a).

As shown in FIG. 9(a) and FIG. 9(b), the optical module holder 32 of the example includes an optical element 35. In the optical element 35, a single ring-shaped groove section 33 is formed on the aspherical (convex-shaped) lens surface 4. A tapered light attenuating refractive surface 34 is formed in the groove section 33. The groove section 33 has a wedge-shaped cross-section in the optical axis 8 direction. The light attenuating refractive surface 34 is ring-shaped when viewed from the optical axis 8 direction.

In the optical module holder 32, the optical element 35, the optical fiber attaching section 11, and the photoelectric conversion element attaching section 12 are integrally formed using a resin material having a refractive index of 1.64.

In the optical module holder 32, the diameter of the lens surface 4 is 1.0 millimeter. The diameter of the flat surface 5 is 1.0 millimeter. The thickness of the optical element 35 is 2.95 millimeters.

Each coefficient in the aspherical surface expression of the lens surface 4 is C=1.64, K=−1.5, and A=0.11.

A range of occupation of the lens surface 4 in the height h direction is 0 (mm)≦h<0.15 (mm) and 0.3 (mm)≦h<0.5 (mm). At the same time, the range of occupation of the light attenuating refractive surface 34 is 0.15 (mm)≦h<0.3 (mm).

In addition, the light attenuating refractive surface 34 satisfies the following expression:

$Z(h)=-h+0.37$ (mm)

When the coupling efficiency is calculated in a following state, the obtained result is 31%. The coupling efficiency is calculated when the optical fiber 2 of which the fiber core 2b diameter=0.06 millimeters and NA=0.28 is attached to the optical fiber attaching section 11 of the optical module holder 32 such as that described above at a position 0.3 millimeters from the flat surface 5. The semiconductor laser 3 that is mounted onto the substrate 14 is attached to the photoelectric conversion element attaching section 12 at a position 1.75 millimeters from the lens surface 4. The wavelength used by the semiconductor laser 3 is 850 nanometers. The FWHM is 30°.

The result is 65% of the coupling efficiency in the comparative example. The result indicates that the optical module holder 32 of the second example is more advantageous for attenuating the amount of light coupled with the optical fiber 2, compared to that of the comparative example.

Third Example

Figure 10:
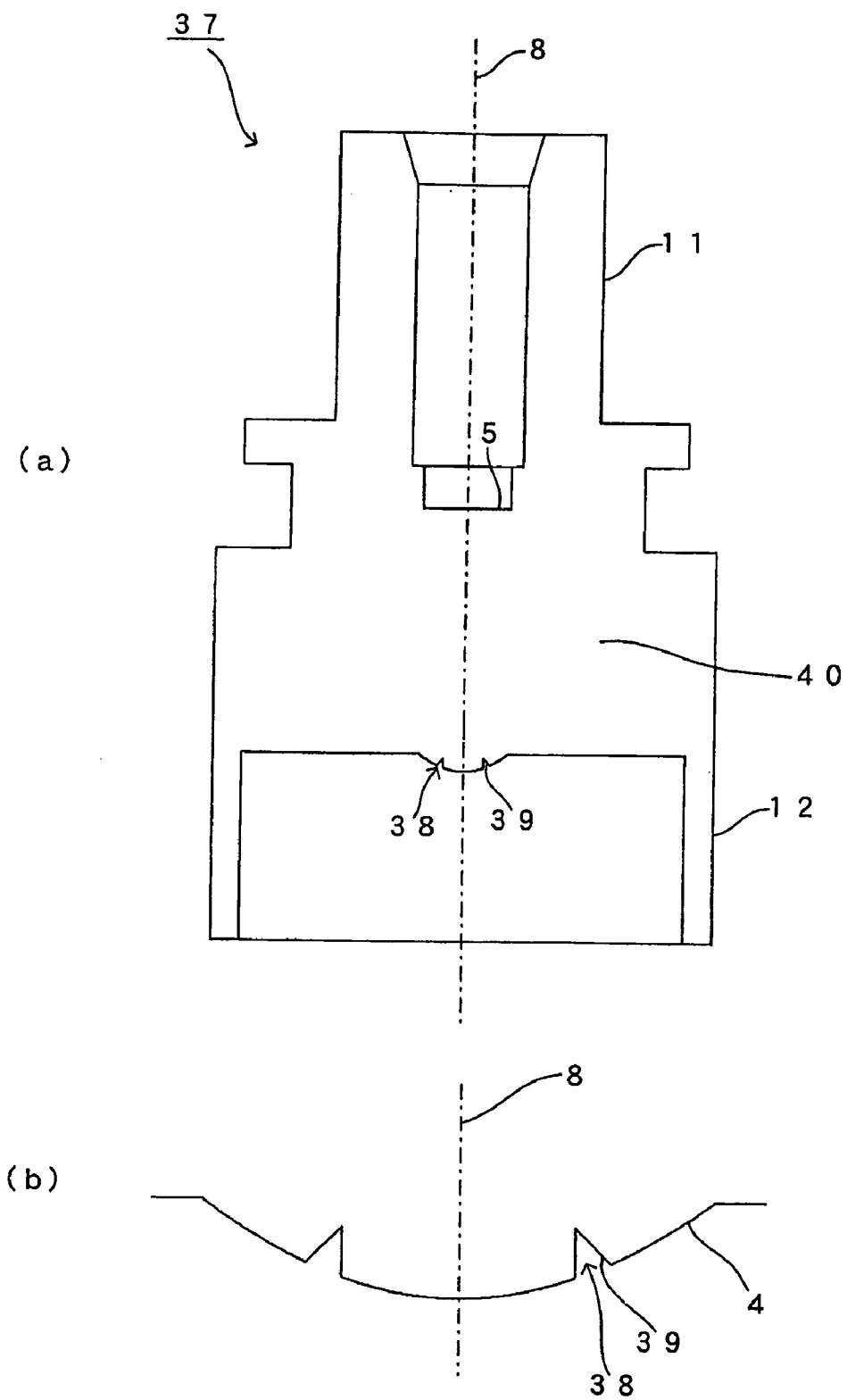
FIG. 10 is a schematic diagram of an optical module holder in a third example of the invention.

Next, FIG. 10(a) shows an optical module holder 37 in a third example. FIG. 10(b) is an enlarged view of the lens surface 4 in FIG. 10(a).

As shown in FIG. 10(a) and FIG. 10(b), the optical module holder 37 of the example includes an optical element 40. In the optical element 40, a single ring-shaped groove section 38 is formed on the aspherical (convex-shaped) lens surface 4. A tapered light attenuating refractive surface 39 is formed in the groove section 38. The groove section 38 has a wedge-shaped cross-section in the optical axis 8 direction. The light attenuating refractive surface 39 is ring-shaped when viewed from the optical axis 8 direction.

In the optical module holder 37, the optical element 40, the optical fiber attaching section 11, and the photoelectric conversion element attaching section 12 are integrally formed using a resin material having a refractive index of 1.64.

In the optical module holder 37, the diameter of the lens surface 4 is 1.0 millimeter. The diameter of the flat surface 5 is 1.0 millimeter. The thickness of the optical element 40 is 2.95 millimeters.

Each coefficient in the aspherical surface expression of the lens surface 4 is C=1.64, K=−1.5, and A=0.11.

A range of occupation of the lens surface 4 in the height h direction is 0 (mm)≦h<0.23 (mm) and 0.3 (mm)≦h<0.5 (mm). At the same time, the range of occupation of the light attenuating refractive surface 39 is 0.23 (mm)≦h<0.3 (mm).

In addition, the light attenuating refractive surface 39 satisfies the following expression:

$Z(h)=-h+0.37$ (mm)

When the coupling efficiency is calculated in a following state, the obtained result is 40%. The coupling efficiency is calculated when the optical fiber 2 of which the fiber core 2b diameter=0.06 millimeters and NA=0.28 is attached to the optical fiber attaching section 11 of the optical module holder 37 such as that described above at a position 0.3 millimeters from the flat surface 5. The semiconductor laser 3 that is mounted onto the substrate 14 is attached to the photoelectric conversion element attaching section 12 at a position 1.75 millimeters from the lens surface 4. The wavelength used by the semiconductor laser 3 is 850 nanometers. The FWHM is 30°.

The result is 83% of the coupling efficiency in the comparative example. The result indicates that the optical module holder 37 of the third example is more advantageous for attenuating the amount of light coupled with the optical fiber 2, compared to that of the comparative example.

Fourth Example

Figure 11:
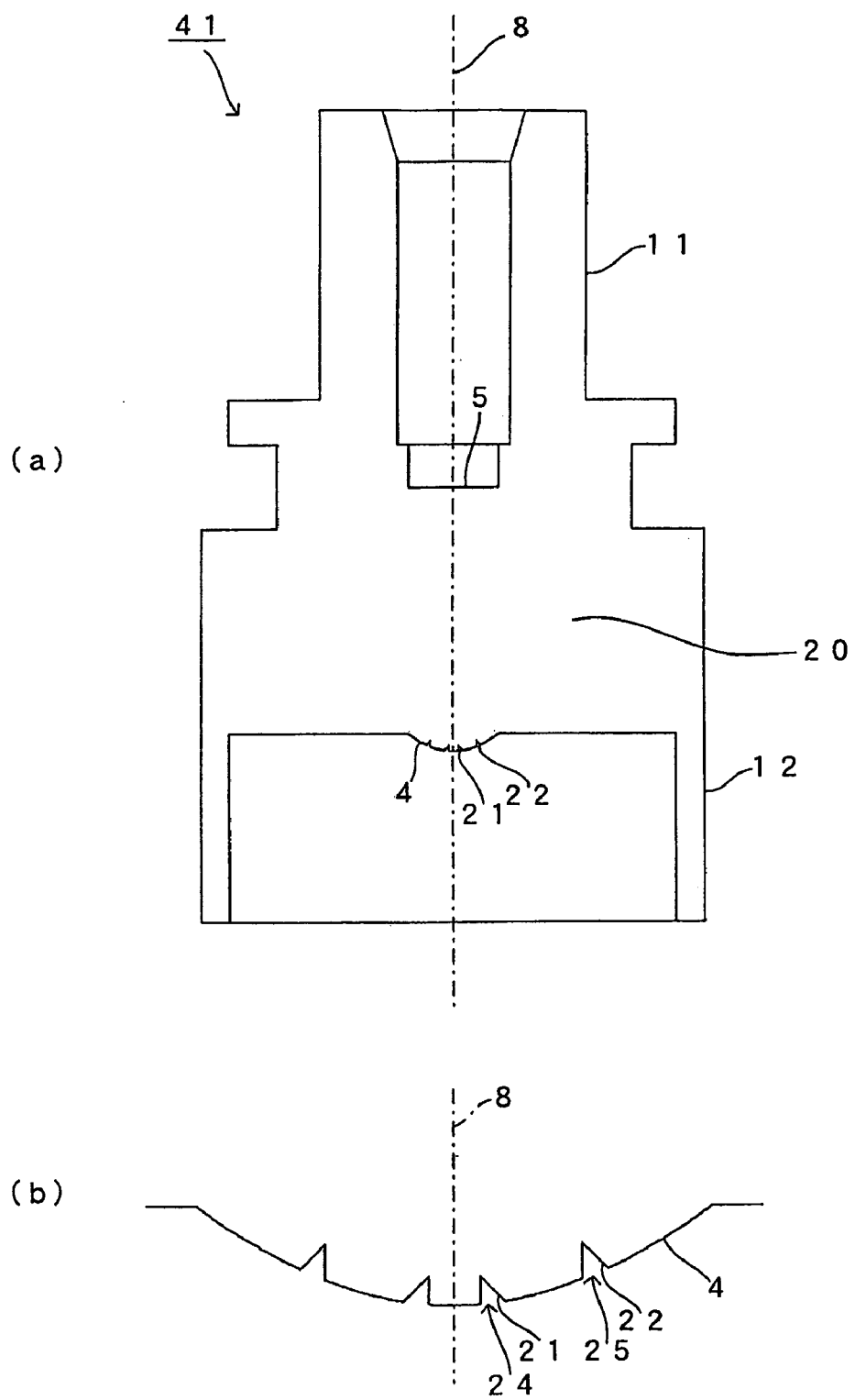
FIG. 11 is a schematic diagram of an optical module holder in a fourth example of the invention.

Next, FIG. 11(a) shows an optical module holder 41 in a fourth example. FIG. 11(b) is an enlarged view of the lens surface 4 in FIG. 11(a).

As shown in FIG. 11(a) and FIG. 11(b), the optical module holder 41 of the example includes the optical element 20. In the optical element 20, the first light attenuating refractive surface 21 and the second light attenuating refractive surface 22, shown in the second embodiment, are each formed on the aspherical (convex-shaped) lens surface 4.

In the optical module holder 41, the optical element 20, the optical fiber attaching section 11, and the photoelectric conversion element attaching section 12 are integrally formed using a resin material having a refractive index of 1.64.

In the optical module holder 41, the diameter of the lens surface 4 is 1.0 millimeter. The diameter of the flat surface 5 is 1.0 millimeter. The thickness of the optical element 20 is 2.95 millimeters.

Each coefficient in the aspherical surface expression of the lens surface 4 is C=1.64, K=−1.5, and A=0.11.

A range of occupation of the lens surface 4 in the height h direction is 0 (mm)≦h<0.05 (mm), 0.1 (mm)≦h<0.25 (mm), and 0.3 (mm)<h<0.5 (mm). At the same time, the range of occupation of the first light attenuating refractive surface 21 is 0.05 (mm)≦h<0.1 (mm). The range of occupation of the second light attenuating refractive surface 22 is 0.25 (mm) ≦h<0.3 (mm).

In addition, the first light attenuating refractive surface 21 satisfies the following expression:

$Z(h)=-h+0.11$ (mm)

At the same time, the second light attenuating refractive surface 22 satisfies the following expression:

$Z(h)=-h+0.37$ (mm)

When the coupling efficiency is calculated in a following state, the obtained result is 39%. The coupling efficiency is calculated when the optical fiber 2 of which the fiber core 2b diameter=0.06 millimeters and NA=0.28 is attached to the optical fiber attaching section 11 of the optical module holder 41 such as that described above at a position 0.3 millimeters from the flat surface 5. The semiconductor laser 3 that is mounted onto the substrate 14 is attached to the photoelectric conversion element attaching section 12 at a position 1.75 millimeters from the lens surface 4. The wavelength used by the semiconductor laser 3 is 850 nanometers. The FWHM is 30°.

The result is 81% of the coupling efficiency in the comparative example. The result indicates that the optical module holder 41 of the fourth example is more advantageous for attenuating the amount of light coupled with the optical fiber 2, compared to that of the comparative example.

Fifth Example

Figure 12:
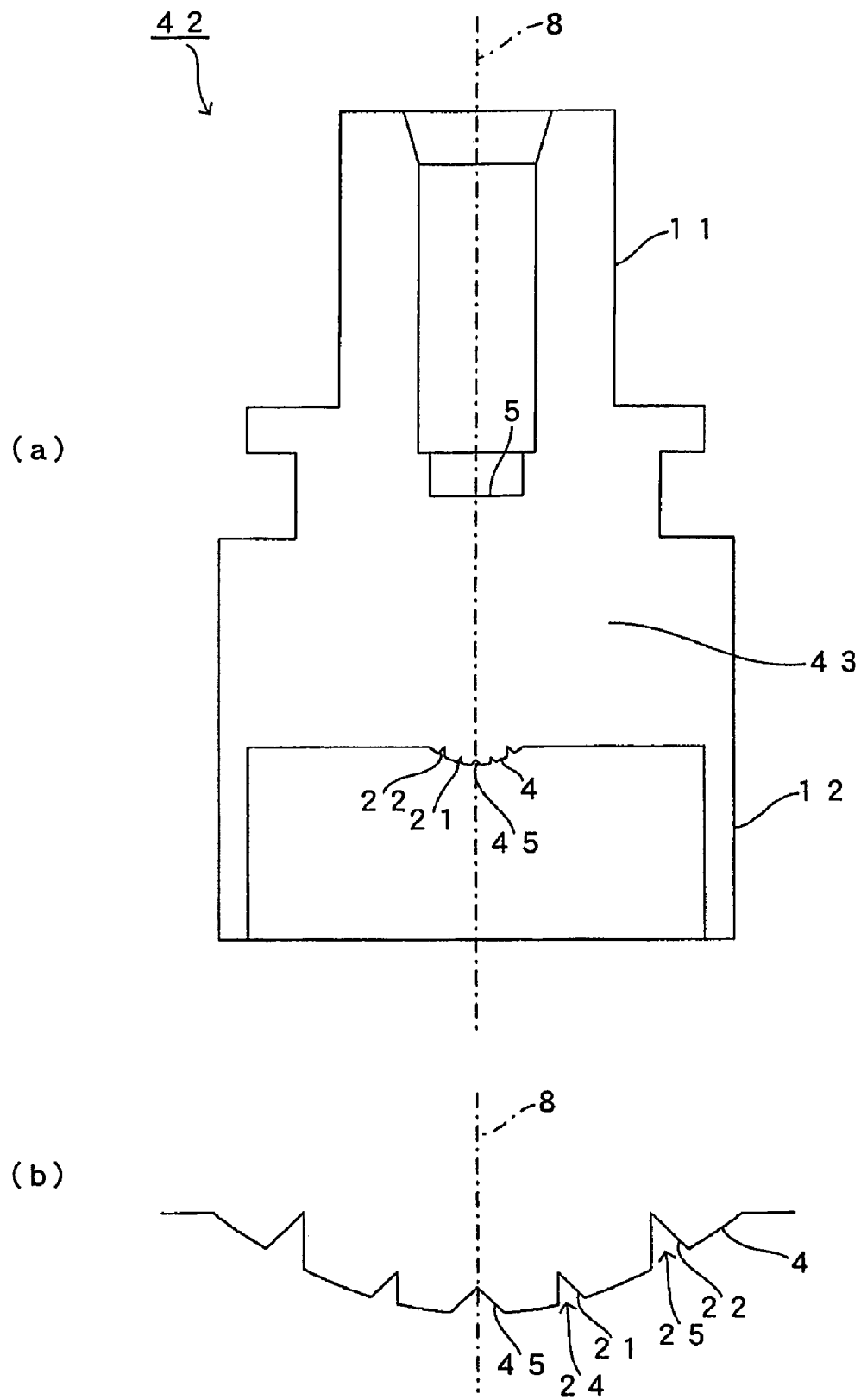
FIG. 12 is a schematic diagram of an optical module holder in a fifth example of the invention.

Next, FIG. 12(a) shows an optical module holder 42 in a fourth example. FIG. 12(b) is an enlarged view of the lens surface 4 in FIG. 12(a).

As shown in FIG. 12(a) and FIG. 12(b), the optical module holder 42 of the example includes an optical element 43. In the optical element 43, the first light attenuating refractive surface 21 and the second light attenuating refractive surface 22, shown in the second embodiment, are each formed on the aspherical (convex-shaped) lens surface 4. A conic third light attenuating refractive surface 45 is formed in the center of the lens surface 4 such as to cave inwards.

In the optical module holder 42, the optical element 43, the optical fiber attaching section 11, and the photoelectric conversion element attaching section 12 are integrally formed using a resin material having a refractive index of 1.64.

In the optical module holder 42, the diameter of the lens surface 4 is 1.0 millimeter. The diameter of the flat surface 5 is 1.0 millimeter. The thickness of the optical element 43 is 2.95 millimeters.

Each coefficient in the aspherical surface expression of the lens surface 4 is C=1.64, K=−1.5, and A=0.11.

A range of occupation of the lens surface 4 in the height h direction is 0.05 (mm)≦h<0.15 (mm), 0.2 (mm)≦h<0.33 (mm), and 0.4 (mm)≦h<0.5 (mm). At the same time, the range of occupation of the third light attenuating refractive surface 45 is 0 (mm)≦h<0.05 (mm). The range of occupation of the first light attenuating refractive surface 21 is 0.15 (mm)≦h<0.2 (mm). The range of occupation of the second light attenuating refractive surface 22 is 0.33 (mm)≦h<0.4 (mm).

In addition, the first light attenuating refractive surface 21 satisfies the following expression:

$$Z(h)=-h+0.23 \text{ (mm)}$$

The second light attenuating refractive surface 22 satisfies the following expression:

$$Z(h)=-h+0.52 \text{ (mm)}$$

The third light attenuating refractive surface 45 satisfies the following expression:

$$Z(h)=-h+0.05 \text{ (mm)}$$

When the coupling efficiency is calculated in a following state, the obtained result is 33%. The coupling efficiency is calculated when the optical fiber 2 of which the fiber core 2b diameter=0.06 millimeters and NA=0.28 is attached to the optical fiber attaching section 11 of the optical module holder 42 such as that described above at a position 0.3 millimeters from the flat surface 5. The semiconductor laser 3 that is mounted onto the substrate 14 is attached to the photoelectric conversion element attaching section 12 at a position 1.75 millimeters from the lens surface 4. The wavelength used by the semiconductor laser 3 is 850 nanometers. The FWHM is 30°.

The result is 69% of the coupling efficiency in the comparative example. The result indicates that the optical module holder 42 of the fifth example is more advantageous for attenuating the amount of light coupled with the optical fiber 2, compared to that of the comparative example.

As described above, in the invention, the amount of light coupled between the optical fiber 2 and the semiconductor laser 3 can be attenuated using the light refraction by the light attenuating refractive surface. Therefore, the manufacturing cost of the optical element can be reduced and appropriate optical communication can be realized.

The present invention is not limited to the above-described embodiments. Various modifications can be made as required.

Figure 13:
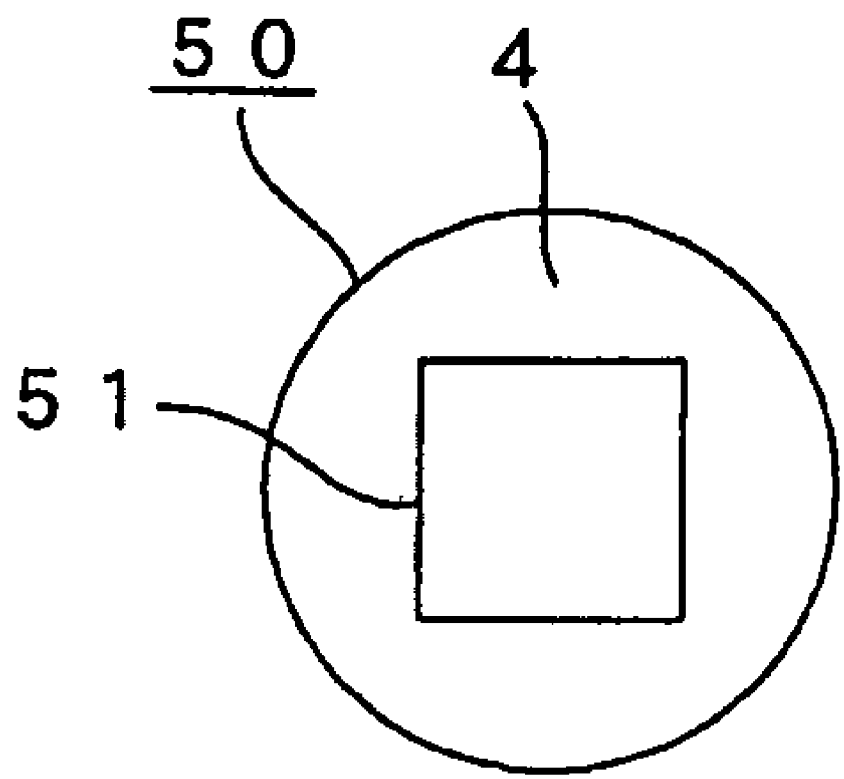
FIG. 13 is a diagram of an optical element in a variation example of the invention, viewed from an optical axis direction.

For example, FIG. 13 is a diagram of a variation example of the above-described embodiments. As in an optical element 50 of the variation example, a light attenuating refractive surface 51 can be rectangular when viewed from the optical axis direction.

The invention can be applied for use in attenuating the amount of light emitted from the end face of the optical fiber and coupled with a photodetector. The photodetector serves as the photoelectric conversion element (photonic element). In this case, a light attenuating refractive surface that refracts a portion of light emitted from the end face of the optical fiber and incident from the optical fiber 2 side such as to be misaligned with the photodetector is formed on the lens surface 4.

What is claimed is:

1. An optical element that, when disposed on an optical path between an optical transmission line and a photonic element that either emits or receives light or both emits and receives light, attenuates an amount of light coupled between the optical transmission line and the photonic element, the optical element wherein:
a light attenuating refractive surface that attenuates the amount of light coupled between the optical transmission line and the photonic element by refracting and deflecting incident light is formed on an optical surface disposed on the optical path between the optical transmission line and the photonic element in a main body of the optical element.

2. The optical element according to claim 1, wherein:
the light attenuating refractive surface is formed at an angle to an optical axis of the optical surface.

3. The optical element according to claim 1, wherein:
the light attenuating refractive surface is formed in a groove section caving inwards from the optical surface and is circular, ring-shaped, or rectangular when viewed from an optical axis direction.

4. The optical element according to claim 3, wherein:
the groove section has a wedge-shaped cross-section in the optical axis direction.

5. The optical element according to claim 1, wherein:
the optical surface has a function for coupling light between the optical transmission line and the photonic element.

6. The optical element according to claim 1, wherein:
the optical surface and the light attenuating refractive surface are integrally formed using a resin material.

7. An optical module holder comprising:
an optical element according to any one of claims 1 to 6;
an optical transmission line attaching section for attaching an end face of an optical transmission line; and
a photonic element attaching section for attaching a photonic element that either emits or receives light or both emits and receives light,
wherein, the optical element, the optical transmission line attaching section, and the photonic element attaching section are integrally formed using a resin material.

8. An optical module comprising:
an optical module holder according to claim 7; and
a photonic element that either emits or receives light or both emits and receives light.

9. An optical connector comprising:
an optical module according to claim 8; and
a housing that houses the optical module.

* * * * *